United States Patent
Eda et al.

(10) Patent No.: US 8,785,010 B2
(45) Date of Patent: Jul. 22, 2014

(54) GLASS SUBSTRATE FOR A MAGNETIC DISK AND MAGNETIC DISK

(75) Inventors: Shinji Eda, Shinjuku-ku (JP); Hideki Isono, Shinjuku-ku (JP); Takashi Maeda, Shinjuku-ku (JP); Hiroshi Tsuchiya, Shinjuku-ku (JP); Yoshinori Marumo, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 135 days.

(21) Appl. No.: 13/120,320

(22) PCT Filed: Sep. 29, 2009

(86) PCT No.: PCT/JP2009/066956
§ 371 (c)(1),
(2), (4) Date: Mar. 22, 2011

(87) PCT Pub. No.: WO2010/038741
PCT Pub. Date: Apr. 8, 2010

(65) Prior Publication Data
US 2011/0171415 A1    Jul. 14, 2011

(30) Foreign Application Priority Data

Sep. 30, 2008 (JP) .................. 2008-254065
Sep. 30, 2008 (JP) .................. 2008-254787

(51) Int. Cl.
*B32B 3/26* (2006.01)
*B24B 7/00* (2006.01)
*C03C 21/00* (2006.01)
*C03C 23/00* (2006.01)
*G11B 5/84* (2006.01)

(52) U.S. Cl.
CPC ............. *C03C 21/008* (2013.01); *C03C 23/009* (2013.01); *G11B 5/8408* (2013.01)
USPC ......... 428/846.9; 428/64.2; 66/29.12; 451/41

(58) Field of Classification Search
CPC    G11B 5/8404; C03C 23/0075; C03C 23/009; C03C 21/008
USPC ............. 428/64.2, 800, 846.9, 832, 826, 141, 428/848.8, 848.2; 250/372, 559.4, 492.1; 360/135; 65/30.13, 30.14, 29.1, 29.21, 65/33.1, 33.4, 33.9, 61, 66, 104, 17.1, 64, 65/29.12, 642; 83/56; 427/128, 129; 134/1; 451/5, 56, 47, 51, 41, 44, 128, 451/259; 216/22
See application file for complete search history.

(56) References Cited

U.S. PATENT DOCUMENTS

| | | | |
|---|---|---|---|
| 2001/0049031 A1* | 12/2001 | Bajorek et al. | 428/694 ST |
| 2002/0125449 A1* | 9/2002 | Ishiguro et al. | 250/559.45 |
| 2003/0228461 A1 | 12/2003 | Yoshikawa et al. | |
| 2005/0045830 A1* | 3/2005 | Shishido et al. | 250/372 |
| 2006/0003170 A1 | 1/2006 | Saito et al. | |
| 2006/0018052 A1* | 1/2006 | Kawai et al. | 360/135 |
| 2006/0194080 A1* | 8/2006 | Ishii et al. | 428/800 |
| 2007/0003796 A1* | 1/2007 | Isono et al. | 428/832 |
| 2007/0254562 A1 | 11/2007 | Machida et al. | |
| 2007/0256703 A1* | 11/2007 | Ikuta | 250/492.1 |
| 2008/0188165 A1 | 8/2008 | Sakaguchi et al. | |
| 2009/0122448 A1* | 5/2009 | Kuraseko et al. | 360/235.4 |
| 2009/0136659 A1* | 5/2009 | Marquez et al. | 427/129 |
| 2009/0252993 A1* | 10/2009 | Kawai et al. | 428/846.9 |
| 2010/0040907 A1* | 2/2010 | Takizawa et al. | 428/846.9 |

FOREIGN PATENT DOCUMENTS

| | | |
|---|---|---|
| EP | 1586614 A1 | 3/2005 |
| JP | 11-258179 A | 9/1999 |
| JP | 2005174500 A | 6/2005 |
| JP | 2006007385 A | 1/2006 |
| JP | 2006-048863 A | 2/2006 |
| JP | 2006-095676 A | 4/2006 |
| JP | 2008-165842 A | 7/2008 |
| JP | 2008-204499 A | 9/2008 |
| WO | 2004/042709 A1 | 5/2004 |
| WO | 2005123857 A1 | 12/2005 |

OTHER PUBLICATIONS

Singapore Supplemental European Search Report corresponding to Singapore Patent Application No. 201102232-4, dated Feb. 27, 2013.

Office Action issued in corresponding Japanese Patent Application No. 2009-228169 dated Aug. 13, 2013.

* cited by examiner

*Primary Examiner* — Kevin M. Bernatz
*Assistant Examiner* — Louis Falasco
(74) *Attorney, Agent, or Firm* — Sughrue Mion, PLLC

(57) ABSTRACT

Provided are a magnetic disk substrate and a method of manufacturing the same, wherein the magnetic disk substrate has very few defects present on its surface with an arithmetic mean roughness (Ra) at a level in the vicinity of 0.1 nm and thus is suitable as a substrate for a magnetic disk with high recording density. The magnetic disk glass substrate is such that the arithmetic mean roughness (Ra) of the main surface of the glass substrate measured using an atomic force microscope with a resolution of 256×256 pixels in a 2 μm×2 μm square is 0.12 nm or less and the number of defects detected to have a size of 0.1 μm to 0.6 μm in plan view and a depth of 0.5 nm to 2 nm is less than 10 per 24 $cm^2$, wherein the defects are each detected using a shift in wavelength between incident light and reflected light upon irradiating and scanning helium neon laser light with a wavelength of 632 nm on the main surface of the glass substrate.

8 Claims, 3 Drawing Sheets

GLASS SUBSTRATE FOR A MAGNETIC DISK AND MAGNETIC DISK

CROSS REFERENCE TO RELATED APPLICATIONS

This application is a National Stage of International Application No. PCT/JP2009/066956, filed on Sep. 29, 2009, which claims priority from Japanese Patent Application Nos. 2008-254065 and 2008-254787, filed on Sep. 30, 2008, the contents of all of which are incorporated herein by reference in their entirety.

TECHNICAL FIELD

This invention relates to a glass substrate for a magnetic disk adapted to be mounted in a hard disk drive device, and to the magnetic disk.

BACKGROUND ART

As a magnetic recording medium adapted to be mounted in a hard disk drive device (HDD device), there is a magnetic disk. The magnetic disk is produced by coating a NiP film on a metal substrate made of an aluminum-magnesium alloy or the like or by laminating a magnetic layer and a protective layer on a glass substrate or a ceramic substrate. Aluminum alloy substrates have conventionally been widely used as substrates for magnetic disks. However, following the reduction in size and thickness and the increase in recording density of magnetic disks in recent years, glass substrates excellent in surface flatness and thin-plate strength as compared with the aluminum alloy substrates have started to be used.

With respect to magnetic disks formed with at least a magnetic layer on a magnetic disk glass substrate, the increase in recording density has advanced year by year and those magnetic disks having a magnetic layer containing granular particles are becoming predominant. In such a magnetic layer, it is necessary to reduce the particle size of the granular particles or enhance the crystal orientation of the granular particles in order to achieve a further increase in recording density (e.g. 160 GB or more per disk, particularly 250 GB or more per disk). In order to reduce the particle size of the granular particles or enhance the crystal orientation of the granular particles as described above, it is necessary to improve the properties of a magnetic disk glass substrate, particularly to reduce its surface roughness or reduce defects present on its surface. As a magnetic disk glass substrate with a reduced surface roughness, there is, for example, one disclosed in Patent Document 1.

In recent years, in order to achieve a further increase in recording density, there has been advanced the development of patterned media such as a discrete track medium in which adjacent tracks are magnetically isolated from each other. As a method of manufacturing such a patterned medium, there is, for example, a method of forming a magnetic layer on a glass substrate and then physically dividing this magnetic layer to thereby isolate tracks from each other. When dividing the magnetic layer, a pattern is formed on the magnetic layer using the nanoimprint technique.

In this event, if a defect (particularly a convex defect) is present on the glass substrate, the above-mentioned pattern is not formed on the magnetic layer where this defect is present. Specifically, the defect on the glass substrate is succeeded in the formation of the magnetic layer so that the defect is also formed on the magnetic layer. If the nanoimprint is carried out in this state, a pattern of a stamper is not formed only around this defect. Further, depending on circumstances, there is a possibility of damage to the stamper. Therefore, in the manufacture of a patterned medium using the nanoimprint technique, it is required that defects be extremely few on a glass substrate.

PRIOR ART DOCUMENT

Patent Document

Patent Document 1: JP-A-2006-95676

SUMMARY OF THE INVENTION

Problem to be Solved by the Invention

When the surface roughness is at a very low level, for example, when the arithmetic surface roughness (Ra) is in the vicinity of 0.1 nm, reducing the surface roughness and reducing defects present on a surface tend to be in a trade-off relationship. That is, just because the surface roughness is reduced, it does not necessarily follow that the number of defects present on the surface is reduced. This is because, in the case of a glass substrate having a surface roughness at the level in the vicinity of 0.1 nm, cleaning which is conventionally carried out for the purpose of removing adhering matter and so on becomes a cause of roughening a surface of the glass substrate. That is, this is because, in the case of the glass substrate having the very low surface roughness at the level in the vicinity of 0.1 nm, it is necessary to use, in order to maintain the surface roughness, a relatively weak chemical solution in cleaning which is carried out for removing defects present on the surface. This tendency is significant particularly when a magnetic disk glass substrate is made of a multi-component glass such as an aluminosilicate glass.

This invention has been made in view of these circumstances and has an object to provide a magnetic disk glass substrate which has very few defects present on its surface with an arithmetic mean roughness (Ra) at a level in the vicinity of 0.1 nm and thus is suitable as a substrate for a magnetic disk with high recording density, and to provide such a magnetic disk.

Means for Solving the Problem

A magnetic disk glass substrate according to one aspect of this invention is characterized in that an arithmetic mean roughness (Ra) of a main surface of the glass substrate measured using an atomic force microscope with a resolution of 256×256 pixels in a 2 µm×2 µm square is 0.12 nm or less and, among defects detected to have a size of 0.1 µm or more and 0.3 µm or less upon irradiating light with a wavelength of 405 nm onto the glass substrate with a spot size of 5 µm and detecting scattered light from the glass substrate, the number of the defects fixed to the glass substrate is 1 or less per 24 $cm^2$.

In the magnetic disk glass substrate according to one aspect of this invention, it is preferable that a ratio (Ra/Rp) of the arithmetic mean roughness (Ra) to a maximum peak height (Rp) on the main surface of the glass substrate is 0.15 or more.

A magnetic disk glass substrate according to another aspect of this invention is characterized in that an arithmetic mean roughness (Ra) of a main surface of the glass substrate measured using an atomic force microscope with a resolution of 256×256 pixels in a 2 µm×2 µm square is 0.12 nm or less and the number of defects detected to have a size of 0.1 µm or more and 0.6 µm or less in plan view and a depth of 0.5 nm or more and 2 nm or less is less than 10 per 24 cm², the defects each being detected using a shift in wavelength between incident light and reflected light upon irradiating and scanning helium neon laser light with a wavelength of 632 nm on the main surface of the glass substrate.

In the magnetic disk glass substrate according to another aspect of this invention, it is preferable that a ratio (Ra/Rv) of the arithmetic mean roughness (Ra) to a maximum valley depth (Rv) on the main surface of the glass substrate is 0.15 or more.

In the magnetic disk glass substrate of this invention having the above-mentioned structure has very few specific defects present on its surface with the arithmetic mean roughness (Ra) at the level in the vicinity of 0.1 nm and thus is suitable as a substrate for a magnetic disk with a high recording density of 160 GB or more per disk, particularly 250 GB or more per disk.

In the magnetic disk glass substrate of this invention, it is preferable that the glass substrate has a disk shape with a hole at a center thereof and, assuming that a distance from the center to an outermost periphery is 100%, a difference ($Ra_O - Ra_I$) between an arithmetic mean roughness ($Ra_O$) of the main surface in a range of 80% or more and 90% or less from the center and an arithmetic mean roughness ($Ra_I$) of the main surface in a range of 10% or more and 20% or less from the center is 0.01 nm or less.

In the magnetic disk glass substrate of this invention, it is preferable that the glass substrate has the main surface and an end face, the main surface and the end face each have a compressive stress layer, and the compressive stress layer of the main surface has a depth which is shallower than that of the compressive stress layer of the end face.

A magnetic disk according to this invention is characterized in that at least a magnetic layer is formed on the magnetic disk glass substrate. In this case, it is preferable that the magnetic disk is a patterned medium in which at least adjacent recording tracks are magnetically isolated from each other.

A magnetic disk glass substrate manufacturing method according to another aspect of this invention is characterized by comprising a polishing step of polishing a main surface of a glass substrate using a polishing liquid containing an additive and a cleaning step of cleaning the glass substrate polished, using a cleaning liquid containing the additive.

In the magnetic disk glass substrate manufacturing method of this invention, it is preferable that the additive contains at least one of carboxylic acid, polyvalent amine, amino acid, aminopolycarboxylic acid, phosphonic acid, phosphinic acid, phosphoric acid, pyrophosphoric acid, tripolyphosphoric acid, amino trimethylene phosphonic acid, and salts thereof.

In the magnetic disk glass substrate manufacturing method of this invention, it is preferable that the additive is contained in the polishing liquid in a range of 0.01 wt % or more and 10.0 wt % or less and is contained in the cleaning liquid in a range of 0.01 wt % or more and 5.0 wt % or less.

In the magnetic disk glass substrate manufacturing method of this invention, it is preferable that the additive is contained in the polishing liquid in a range of 0.1 wt % or more and 5.0 wt % or less and is contained in the cleaning liquid in a range of 0.1 wt % or more and 3.0 wt % or less.

Effect of the Invention

In the magnetic disk glass substrate of this invention, an arithmetic mean roughness (Ra) of a main surface of the glass substrate measured using an atomic force microscope with a resolution of 256×256 pixels in a 2 μm×2 μm square is 0.12 nm or less and, among defects detected to have a size of 0.1 μm or more and 0.3 μm or less upon irradiating light with a wavelength of 405 nm onto the glass substrate with a spot size of 5 μm and detecting scattered light from the glass substrate, the number of the defects fixed to the glass substrate is 1 or less per 24 cm². Accordingly, the number of defects present on the surface with the arithmetic mean roughness (Ra) at the level in the vicinity of 0.1 nm is very small.

Therefore, it is suitable as a substrate for manufacturing a magnetic disk having magnetic particles with a much smaller size, for example, having a recording density of 160 GB or more per disk, particularly 250 GB or more per disk.

In the magnetic disk glass substrate of this invention, an arithmetic mean roughness (Ra) of a main surface of the glass substrate measured using an atomic force microscope with a resolution of 256×256 pixels in a 2 μm×2 μm square is 0.12 nm or less and the number of defects detected to have a size of 0.1 μm or more and 0.6 μm or less in plan view and a depth of 0.5 nm or more and 2 nm or less is less than 10 per 24 cm², the defects each being detected using a shift in wavelength between incident light and reflected light upon irradiating and scanning helium neon laser light with a wavelength of 632 nm on the main surface of the glass substrate. Accordingly, the number of defects present on the surface with the arithmetic mean roughness (Ra) at the level in the vicinity of 0.1 nm is very small.

Therefore, it is suitable as a substrate for manufacturing a magnetic disk having magnetic particles with a much smaller size, for example, having a recording density of 160 GB or more per disk, particularly 250 GB or more per disk.

Further, according to the magnetic disk glass substrate manufacturing method of this invention, since the additive contained in the polishing liquid used in the polishing step is contained in the cleaning liquid, it is possible, in the cleaning step, to remove foreign matter (adhering matter) from the surface of the glass substrate while maintaining the form of secondary aggregation of the polishing agent and maintaining the interaction thereof with the surface of the glass substrate. Further, with the above-mentioned configuration, it is possible to easily remove the foreign matter by increasing the chemical affinity. As a consequence, it is possible to manufacture a magnetic disk glass substrate which has very few defects present on its surface with an arithmetic mean roughness (Ra) at a level in the vicinity of 0.1 nm and thus is suitable as a substrate for a magnetic disk with high recording density.

MODE FOR CARRYING OUT THE INVENTION

While developing a magnetic disk glass substrate that satisfies the requirement for improving the recording density which will increase more and more in the future, the present inventors have found that, for example, even using glass substrates with the same roughness and with the same number of defects as a result of an inspection by a specific defect inspection apparatus, there are differences in a reliability test and so on after the glass substrates are formed into magnetic disks. Then, as a result of diligently studying its reason, the present inventors have found that, among the defects judged by the defect inspection apparatus, there are those fixed to the glass substrate and those not fixed to the glass substrate and that the defects fixed to the glass substrate affect the reliability test and so on. Then, as a result of further intensive studies for solving this problem, the present inventors have found a method of significantly reducing defects fixed to a glass substrate, have found that it is possible to provide a magnetic disk substrate capable of achieving both a low roughness and few fixed defects, and have completed this invention.

Further, the present inventors have found that if, among defects, particularly a concave defect of a specific size and depth is present on a glass substrate, the reliability of a magnet disk is adversely affected. Then, as a result of further intensive studies for solving this problem, the present inventors have found a method of significantly reducing concave defects of a specific size and depth on a glass substrate, have found that it is possible to provide a magnetic disk glass substrate capable of achieving both a low roughness and few concave defects, and have completed this invention.

Hereinbelow, embodiments of this invention will be described in detail with reference to the accompanying drawings.

Embodiment 1

Figure 1:
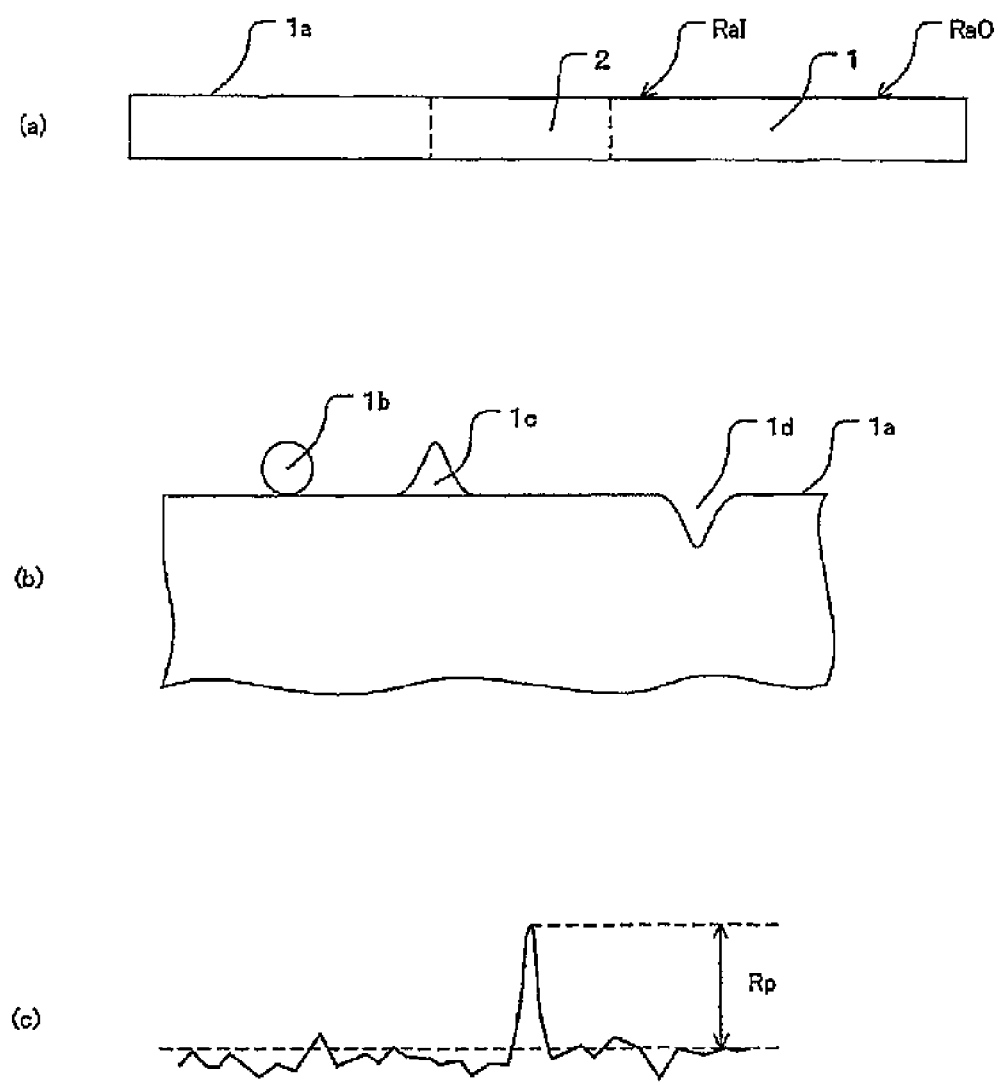
FIG. 1 shows diagrams of a magnetic disk glass substrate according to an embodiment of this invention, wherein (a) is a side view, (b) is a diagram for explaining defects present on a surface thereof, and (c) is a diagram for explaining the roughness of the surface.

FIG. 1 shows diagrams of a magnetic disk glass substrate according to an embodiment 1, wherein (a) is a side view, (b) is a diagram for explaining defects present on a surface thereof, and (c) is a diagram for explaining the roughness of the surface.

A magnetic disk glass substrate 1 shown in FIG. 1 is such that an arithmetic mean roughness (Ra) of a main surface of the glass substrate measured using an atomic force microscope with a resolution of 256×256 pixels in a 2 μm×2 μm square is 0.12 nm or less and, among defects detected to have a size of 0.1 μm or more and 0.3 μm or less upon irradiating light with a wavelength of 405 nm onto the glass substrate with a spot size of 5 μm and detecting scattered light from the glass substrate, the number of the defects fixed to the glass substrate is 1 or less per 24 cm$^2$.

As shown in FIG. 1(b), defects present on a surface 1a of the magnetic disk glass substrate 1 include adhering matter 1b of the kind that can be easily removed by cleaning, and a convex defect 1c fixed to the surface and a concave defect 1d which either cannot be easily removed by cleaning. The defect intended in this embodiment is the convex defect 1c fixed to the surface or the concave defect 1d such as a crack generated in glass substrate processing or a damage generated in substrate fluidization/transfer. That is, the defect intended in this embodiment is a convex defect or a concave defect (stationary defect) remaining without moving on the surface 1a of the magnetic disk glass substrate 1 before and after cleaning under a condition of immersion for 200 seconds in a dilute sulfuric acid solution adjusted to pH4. The cleaning condition of the immersion for 200 seconds in the dilute sulfuric acid solution adjusted to pH4 is a condition that is sufficient for removing the non-fixed adhering matter 1b while maintaining the level of 0.12 nm or less of the surface roughness (arithmetic mean roughness (Ra)) of the surface 1a of the magnetic disk glass substrate 1 after the cleaning.

That is, in this embodiment, the stationary defect represents a defect whose position on the glass substrate is not changed (a defect judged not to have moved) before and after the glass substrate is immersed for 200 seconds in the dilute sulfuric acid solution adjusted to pH4. Specifically, it is possible to specify a stationary defect by specifying a position of a defect on the glass substrate using an optical defect inspection apparatus, then specifying again a position of the defect on the glass substrate using the above-mentioned apparatus after immersing the glass substrate for 200 seconds in the dilute sulfuric acid solution adjusted to pH4 and cleaning the glass substrate with water and IPA, and then comparing the positions of the defect before and after the cleaning.

It is considered that, with the arithmetic mean roughness (Ra) at the level of 0.12 nm or less, a defect that is not conventionally recognized as a defect newly affects as a defect the properties of the magnetic disk glass substrate. Therefore, it is necessary to control the number of defects that are detected by an apparatus capable of detecting a defect with a size of about 1 μm or less. In this embodiment, the number of defects is the number of defects that are detected by such an apparatus capable of detecting a defect with a size of about 1 μm or less.

Herein, in this specification, the size of a defect represents the width of a defect in a main surface direction (not a depth direction) of the substrate and, when a defect is not circular, the size of the defect represents the longer diameter thereof. For example, in FIG. 3, the size of a defect 21d is given by W.

Figure 2:
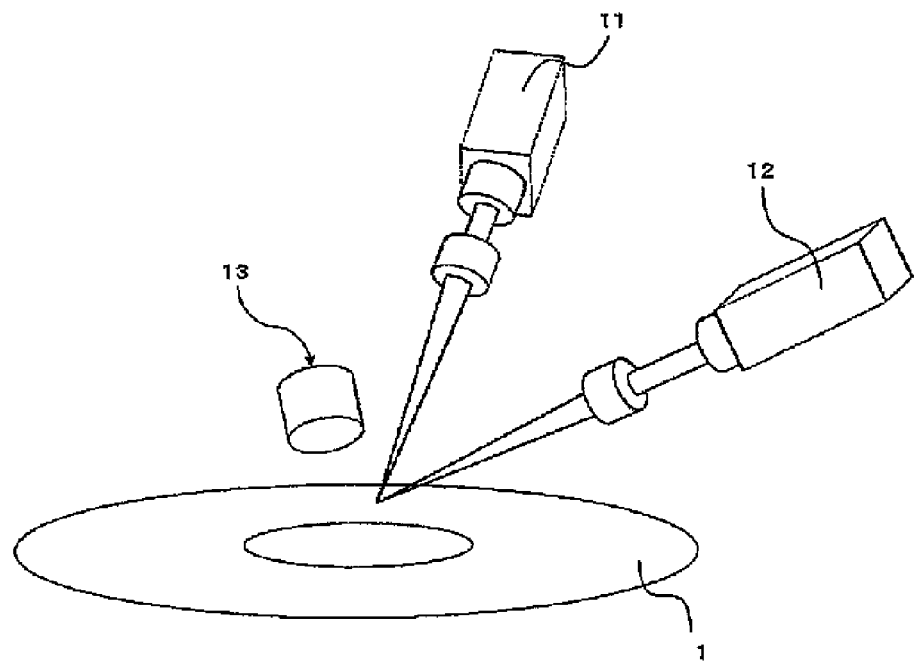
FIG. 2 is a diagram showing a schematic structure of an apparatus adapted to detect a defect on the magnetic disk glass substrate.

As the apparatus for inspecting a defect on the surface of the magnetic disk glass substrate 1, there is, for example, an apparatus having a structure shown in FIG. 2. The apparatus shown in FIG. 2 is an optical defect inspection apparatus (Optical Surface Analyzer) and comprises two lasers 11 and 12 and a detector 13 for detecting reflected light of laser light. The laser 11 irradiates light having directivity onto the glass substrate 1 as a measurement object in a radial direction thereof while the laser 12 irradiates light having directivity onto the glass substrate 1 as the measurement object in a circumferential direction thereof. In such an apparatus, it is possible to detect a defect having a length in the radial direction and a defect having a length in the circumferential direction. Further, each laser is capable of separating laser light into its spectral components, i.e. capable of separating laser light into laser light in a direction perpendicular to the glass substrate 1 and laser light in a direction horizontal to the glass substrate 1. Suitable directivity of laser light depends on the kind of a defect. Therefore, by separating the laser light into its spectral components as described above, it is possible to accurately carry out detection of various defects. Further, in the apparatus shown in FIG. 2, the laser size is as small as, for example, about 4 μm×5 μm, the laser wavelength is short, and the power is large so that the defect detection sensitivity is high.

The magnetic disk glass substrate 1 according to this embodiment is such that the number of defects detected to have a size of 0.1 μm or more and 0.3 μm or less is 1 or less per 24 cm$^2$ upon irradiating light with a wavelength of 405 nm onto the substrate with a spot size of 5 μm and detecting scattered light from the substrate using the apparatus shown in FIG. 2. The magnetic disk glass substrate having very few defects present on its surface with the arithmetic mean roughness (Ra) at the level in the vicinity of 0.1 nm as described above is suitable as a substrate for a magnetic disk with high recording density.

The apparatus shown in FIG. 2 is one example. As long as an apparatus is of the type that irradiates light having directivity onto a glass substrate in circumferential and radial directions thereof and detects a defect based on reflected light from the glass substrate, it can be similarly used in this embodiment.

In a hard disk drive (HDD) device incorporating a magnetic disk, with the advance in device size reduction, the distance between the magnetic disk and a magnetic head has been reduced. As a consequence, with respect to a convex defect among defects on the surface of the magnetic disk glass substrate 1 that cannot be easily removed by cleaning, after a magnetic layer and so on are provided on the magnetic disk glass substrate 1 to form a magnetic disk, there is a possibility of the convex defect exerting influence upon collision of the magnetic head. Therefore, it is preferable that particularly the convex defect be as small as possible.

Specifically, a ratio (Ra/Rp) of an arithmetic mean roughness (Ra) to a maximum peak height (Rp) on a surface of a magnetic disk glass substrate is preferably 0.15 or more. Herein, as shown in FIG. 1(c), the maximum peak height (Rp) represents a distance (height) between a mean reference line (broken line in FIG. 1(c)) and a maximum peak portion.

By setting the ratio (Ra/Rp) of the arithmetic mean roughness (Ra) to the maximum peak height (Rp) on the main surface to 0.15 or more, the flying stability of a magnetic head (particularly a DHF head) can be further improved in a hard disk drive incorporating a magnetic disk manufactured using such a glass substrate. Therefore, the above-mentioned magnetic disk glass substrate can be suitably applied even to a hard disk drive with increased recording density.

Further, taking into account that the distance between the magnetic disk and the magnetic head has been reduced, the arithmetic mean roughness (Ra) is preferably uniform in a wide region of the magnetic disk glass substrate.

Specifically, as shown in FIG. 1(a), it is preferable that the magnetic disk glass substrate 1 have a disk shape with a hole 2 at the center thereof and that, assuming that the distance from the center to the outermost periphery is 100%, a difference ($Ra_O$–$Ra_I$) between an arithmetic mean roughness ($Ra_O$) of the main surface in a range of 80% or more and 90% or less from the center and an arithmetic mean roughness ($Ra_I$) of the main surface in a range of 10% or more and 20% or less from the center be 0.01 nm or less.

With this structure, it is possible to reduce variation in surface roughness on the glass substrate surface and thus to further improve the flying stability of a magnetic head (particularly a DHF head).

As one example of a method of manufacturing this magnetic disk glass substrate, final polishing (herein, a second polishing process) may be carried out using a method of polishing the glass substrate surface by uniformly applying a force thereto. Specifically, for example, this can be achieved using a planetary gear type polishing machine to polish a plurality of glass substrates while holding them between upper and lower surface plates.

The magnetic disk glass substrate 1 according to this embodiment is an isotropic substrate. That is, the surface roughness (arithmetic mean roughness (Ra)) of the glass substrate in its circumferential direction and the surface roughness thereof in its radial direction are equal to each other.

As a material of the magnetic disk glass substrate 1, there can be cited a multi-component glass such as an aluminosilicate glass, an aluminoborosilicate glass, or a sodalime glass, a crystallized glass, or the like. Particularly, the aluminosilicate glass is preferable because it can be easily processed and it can be increased in rigidity by chemical strengthening or the like.

The magnetic disk glass substrate 1 according to this embodiment has main surfaces and end faces and may be configured such that the main surfaces and the end faces are formed with a compressive stress layer and the depth of the compressive stress layer of each main surface is shallower than the depth of the compressive stress layer of each end face. The manufacture of the magnetic disk glass substrate of the above-mentioned structure can be achieved, for example, by applying chemical strengthening as ion exchange to the glass substrate and then applying a polishing process to both main surfaces of the substrate.

A magnetic disk is produced by forming at least a magnetic layer on the magnetic disk glass substrate 1 having the above-mentioned structure. That is, normally, a magnetic disk is manufactured by laminating an underlayer, a magnetic layer, a protective layer, and a lubricating layer in this order on a magnetic disk glass substrate. The underlayer in the magnetic disk is properly selected depending on the magnetic layer.

Since the magnetic disk of this invention is free of specific defects, it can be suitably used particularly as a patterned medium in which at least adjacent recording tracks are magnetically isolated from each other.

Herein, the patterned medium is a magnetic recording medium in which a plurality of magnetic regions each serving as a recording bit unit are independently formed in a nonmagnetic layer.

Embodiment 2

Figure 3:
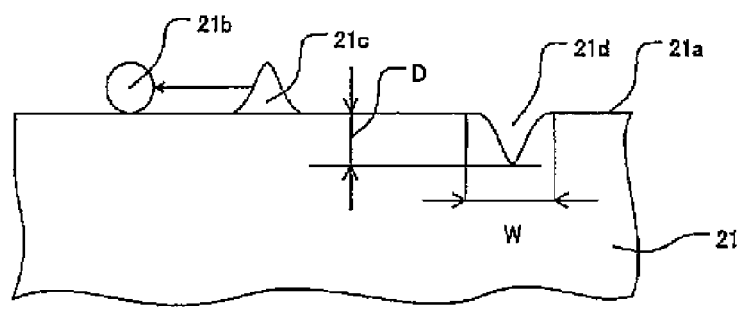
FIG. 3 is a diagram for explaining defects present on a surface of a magnetic disk glass substrate according to an embodiment of this invention.

FIG. 3 is a diagram for explaining defects present on a surface of a magnetic disk glass substrate according to an embodiment 2.

A magnetic disk glass substrate 21 shown in FIG. 3 is such that an arithmetic mean roughness (Ra) of a main surface of the glass substrate measured using an atomic force microscope with a resolution of 256×256 pixels in a 2 μm×2 μm square is 0.12 nm or less and the number of defects detected to have a size of 0.1 μm or more and 0.6 μm or less in plan view and a depth of 0.5 nm or more and 2 nm or less is less than 10 per 24 cm$^2$, the defects each being detected using a shift in wavelength between incident light and reflected light upon irradiating and scanning helium neon laser light with a wavelength of 632 nm on the main surface of the glass substrate.

As shown in FIG. 3, defects present on a surface 21a of the magnetic disk glass substrate 21 include adhering matter 21b of the kind that can be easily removed by cleaning, and a convex defect 21c and a concave defect 21d which either cannot be easily removed by cleaning. In a conventional magnetic disk glass substrate, there is a micropit as a concave defect. This micropit has a size of several μm. Therefore, if a magnetic layer is formed on the magnetic disk glass substrate in the state where the micropit is present, the magnetic layer follows the micropit to form a concave portion and this concave portion forms a missing bit. Since this way the micropit conventionally forms the missing bit to cause a signal problem, it has been desired that the magnetic disk glass substrate has no micropit.

Figure 4:
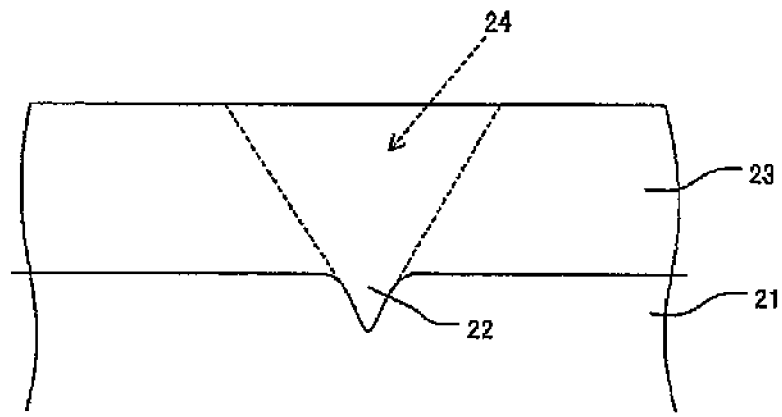
FIG. 4 is a diagram for explaining a crack of a magnetic layer in a magnetic disk.

It has been found that when the increase in recording density advances to reach a recording density of 160 GB or more per disk, particularly 250 GB or more per disk, a very low surface roughness (Ra) at the level in the vicinity of 0.1 nm is necessary and, simultaneously, concave defects having a size of 1 μm or less, i.e. so-called nanopits, are desirable to be as few as possible. This is because, as shown in FIG. 4, when a magnetic layer 23 is formed on the magnetic disk glass substrate 21 in the state where a nanopit 22 is present, a crack 24 occurs starting from a magnetic layer portion on the nanopit. Then, if the crack 24 occurs in the magnetic layer 23 in this manner, corrosion of the magnetic layer 23 proceeds from the crack portion. Accordingly, in a substrate for a magnetic disk with a recording density of 250 GB or more per disk, being free of nanopits is important in terms of the reliability of a magnetic layer. Therefore, the defect intended in this embodiment is a concave defect having a size of 0.1 μm or more and 0.6 μm or less in plan view and a depth of 0.5 nm or more and 2 nm or less (a so-called nanopit) and the technical idea of this embodiment is to control the number of nanopits to be reduced in a magnetic disk glass substrate. In this embodiment, the number of defects is the number of defects that are detected by an apparatus capable of detecting such a defect having a size of 0.1 μm or more and 0.6 μm or less in plan view and a depth of 0.5 nm or more and 2 nm or less.

Figure 5:
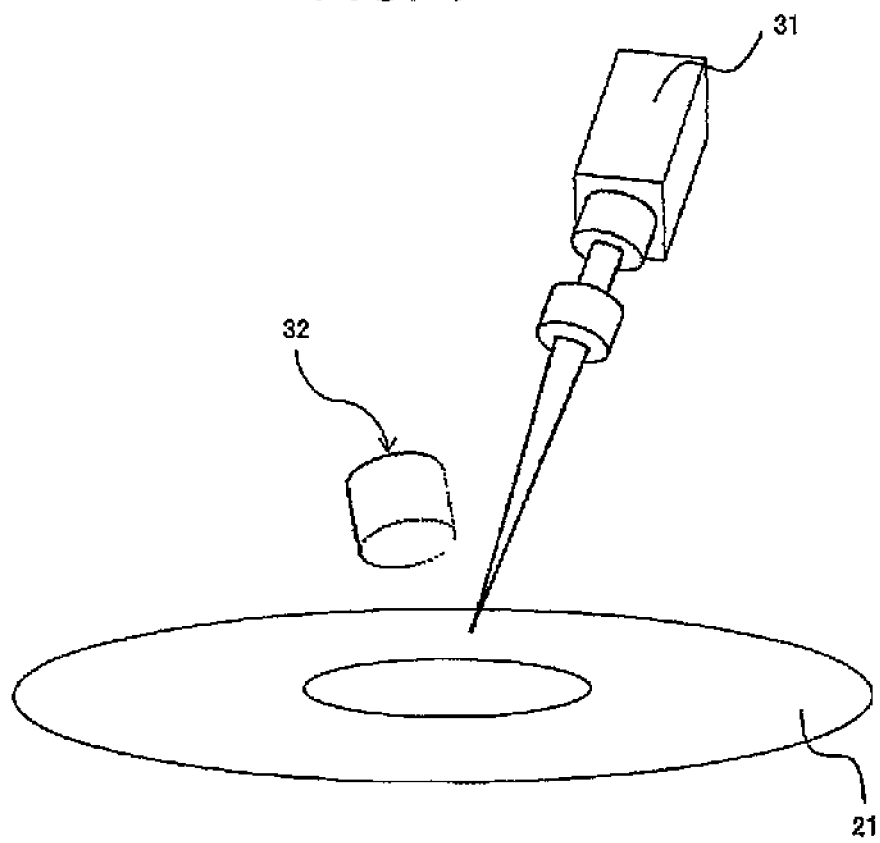
FIG. 5 is a diagram showing a schematic structure of an apparatus adapted to detect a defect on the magnetic disk glass substrate.

As the apparatus for inspecting a defect on the surface of the magnetic disk glass substrate, there is, for example, an apparatus having a structure shown in FIG. 5. The apparatus shown in FIG. 5 is an optical defect inspection apparatus and is an apparatus using the laser Doppler technique. This apparatus comprises a laser 31 and a detector 32 for detecting reflected light of laser light. The laser 31 irradiates and scans laser light on the magnetic disk glass substrate 21 as a measurement object. Then, the detector 32 detects a nanopit based on a shift in wavelength between incident light and reflected light when the laser light is irradiated and scanned on the magnetic disk glass substrate 21.

The magnetic disk glass substrate according to this embodiment is such that the number of defects detected to have a size of 0.1 μm or more and 0.6 μm or less in plan view and a depth of 0.5 nm or more and 2 nm or less is less than 10 per 24 cm$^2$, wherein the defects are each detected using a shift in wavelength between incident light and reflected light upon irradiating and scanning helium neon laser light with a wavelength of 632 nm on the magnetic disk glass substrate by the use of the apparatus shown in FIG. 5. The glass substrate having very few defects present on its surface with the arithmetic mean roughness (Ra) at the level in the vicinity of 0.1 nm as described above is suitable as a substrate for a magnetic disk with high recording density.

In the magnetic disk glass substrate 21 according to this embodiment, it is more preferable that a ratio (Ra/Rv) of an arithmetic mean roughness (Ra) to a maximum valley depth (Rv) on the main surface thereof be 0.15 or more. With this structure, the flying stability of a magnetic head (particularly a DHF head) can be further improved in a hard disk drive incorporating a magnetic disk manufactured using such a glass substrate. Therefore, the above-mentioned magnetic disk glass substrate can be suitably applied even to a hard disk drive with increased recording density.

It is more preferable that the magnetic disk glass substrate 21 according to this embodiment have a disk shape with a hole at the center thereof and that, assuming that the distance from the center to the outermost periphery is 100%, a difference ($Ra_O - Ra_I$) between an arithmetic mean roughness ($Ra_O$) of the main surface in a range of 80% or more and 90% or less from the center and an arithmetic mean roughness ($Ra_I$) of the main surface in a range of 10% or more and 20% or less from the center be 0.01 nm or less. With this structure, it is possible to reduce variation in surface roughness on the glass substrate surface and thus to further improve the flying stability of a magnetic head (particularly a DHF head).

As one example of a method of manufacturing this magnetic disk glass substrate, final polishing (herein, a second polishing process) may be carried out using a method of polishing the glass substrate surface by uniformly applying a force thereto. Specifically, for example, this can be achieved using a planetary gear type polishing machine to polish a plurality of glass substrates while holding them between upper and lower surface plates.

The magnetic disk glass substrate 21 according to this embodiment has main surfaces and end faces and may be configured such that the main surfaces and the end faces are formed with a compressive stress layer and the depth of the compressive stress layer of each main surface is shallower than the depth of the compressive stress layer of each end face. The manufacture of the magnetic disk glass substrate of the above-mentioned structure can be achieved, for example, by applying chemical strengthening as ion exchange to the glass substrate and then applying a polishing process to both main surfaces of the glass substrate.

As a material of the magnetic disk glass substrate 21, there can be cited a multi-component glass such as an aluminosilicate glass, an aluminoborosilicate glass, or a sodalime glass, a crystallized glass, or the like. Particularly, the aluminosilicate glass is preferable because it can be easily processed and it can be increased in rigidity by chemical strengthening or the like.

A magnetic disk is produced by forming at least a magnetic layer on the magnetic disk glass substrate having the above-mentioned structure. That is, normally, a magnetic disk is manufactured by laminating an underlayer, a magnetic layer, a protective layer, and a lubricating layer in this order on a magnetic disk glass substrate. The underlayer in the magnetic disk is properly selected depending on the magnetic layer.

Since the magnetic disk of this invention is free of specific defects, it can be suitably used particularly as a patterned medium in which at least adjacent recording tracks are magnetically isolated from each other.

Embodiment 3

In this embodiment, a magnetic disk glass substrate manufacturing method will be described.

The magnetic disk glass substrate manufacturing method according to this embodiment comprises a process of applying at least shaping and lapping to a glass substrate having a pair of main surfaces, a polishing process of polishing the main surfaces, and a cleaning process of cleaning the glass substrate after the polishing, wherein an additive contained in a polishing liquid for use in the polishing process is contained in a cleaning liquid for use in the cleaning process.

More specifically, the manufacture of a magnetic disk glass substrate comprises (1) Shaping Process and First Lapping Process, (2) End Portion Shaping Process (coring process for forming a hole and chamfering process for forming chamfered faces at end portions (outer peripheral end portion and inner peripheral end portion) (chamfered face forming process)), (3) End Face Polishing Process (outer peripheral end portion and inner peripheral end portion), (4) Second Lapping Process, and (5) Main Surface Polishing Process (first and second polishing processes) and Cleaning Process. Further, it is preferable to carry out a chemical strengthening process. It is possible to properly change the order of the respective processes, but in order to manufacture a magnetic disk glass substrate of this invention, it is preferable to carry out the chemical strengthening process and the second polishing process after the first polishing process.

In this embodiment, attention is paid to (5) Polishing Process of Main Surface Polishing Process and Cleaning Process among the above-mentioned processes. In the polishing process and the cleaning process, by causing an additive contained in a polishing liquid to be contained in a cleaning liquid, it is possible to remove foreign matter (adhering matter) from surfaces of a glass substrate while maintaining the form of secondary aggregation of the polishing agent and maintaining the interaction thereof with the surfaces of the glass substrate. Further, with the above-mentioned configuration, it is possible to easily remove the foreign matter by increasing the chemical affinity. As a consequence, it is possible to achieve a magnetic disk glass substrate which has very few defects present on its surface with an arithmetic mean roughness (Ra) at a level in the vicinity of 0.1 nm and thus is suitable as a substrate for a magnetic disk with high recording density.

As the additive which is contained in the polishing liquid for use in the polishing process and in the cleaning liquid for use in the cleaning process, there can be cited one containing at least one of carboxylic acids such as acetic acid, malic acid, oxalic acid, malonic acid, succinic acid, glycolic acid, citric acid, and tartaric acid, polyvalent amines such as ethylenediamine and diethylenetriamine, amino acids such as glycine, alanine, serine, and aspartic acid, aminopolycarboxylic acids such as ethylenediaminetetraacetic acid and nitrilotriacetic acid, phosphonic acids such as hydroxyethylidene diphosphonic acid, methylene phosphonic acid, and hydroxyethane phosphonic acid (HEDP), phosphinic acids, phosphoric acids such as pyrophosphoric acid and tripolyphosphoric acid, pyrophosphoric acids, tripolyphosphoric acids, amino trimethylene phosphonic acids, and the like. Salts of the acids exemplified above may also be used. Among them, salts of polyhydroxy acids such as sodium phosphate, monosodium dihydrogen phosphate, disodium monohydrogen phosphate, and potassium oxalate are more preferable.

Among them, as one having a chelating action (a chelating agent), there can be cited, for example, carboxylic acid such as oxalic acid, malonic acid, glycolic acid, citric acid, or tartaric acid, polyvalent amine such as ethylenediamine or diethylenetriamine, amino acid such as glycine, alanine, serine, or aspartic acid, aminopolycarboxylic acid such as ethylenediaminetetraacetic acid or nitrilotriacetic acid, phosphonic acid such as hydroxyethylidene diphosphonic acid or methylene phosphonic acid, phosphoric acid such as pyrophosphoric acid or tripolyphosphoric acid, or the like. As one having a dispersing action (a dispersant), there can be cited, for example, an anionic surface active agent such as sulfo fatty acid ester, alkylbenzene sulfonic acid, alkyl sulfate, alkyl sulfuric acid triethanolamine, or alkyl ether sulfuric acid ester, a nonionic surface active agent such as fatty acid diethanolamide, polyoxyethylene alkyl ether, or polyoxyethylene alkyl phenyl ether, amine, or the like.

Taking into account the suppression of the surface roughness of the glass substrate, the foreign matter removal capability, excessive or insufficient aggregation of the polishing agent, the influence on environment when the cleaning liquid is drained off, and so on, the additive is preferably contained in the polishing liquid in a range of 0.01 wt % or more and 10.0 wt % or less and more preferably in a range of 0.1 wt % or more and 5.0 wt % or less, while the additive is preferably contained in the cleaning liquid in a range of 0.01 wt % or more and 5.0 wt % or less and more preferably in a range of 0.1 wt % or more and 3.0 wt % or less.

Next, a description will be given of Examples which were carried out for clarifying the effect of this invention.

Example 1 Relating to Embodiment 1

Hereinbelow, a description will be given of an Example about methods of manufacturing a magnetic disk glass substrate and a magnetic disk to which this invention is applied. These magnetic disk glass substrate and magnetic disk are manufactured as a magnetic disk having a predetermined shape, such as a 3.5-inch disk ($\phi$89 mm) or a 2.5-inch disk ($\phi$65 mm).

(1) First Lapping Process

In the magnetic disk glass substrate manufacturing method according to this Example, first, lapping (grinding) is applied to surfaces of a plate-like glass to obtain a glass base member, then this glass base member is cut, thereby cutting out a glass disk. As the plate-like glass, one of various plate-like glasses can be used. This plate-like glass can be manufactured by a known manufacturing method such as a press method, a float method, a downdraw method, a redraw method, or a fusion method using, for example, a molten glass as a material. If the press method is used among them, the plate-like glass can be manufactured at low cost. As a material property of the plate-like glass, use can be made of an amorphous glass or a glass ceramic (crystallized glass). As a material of the plate-like glass, use can be made of an aluminosilicate glass, a sodalime glass, a borosilicate glass, or the like. Particularly as the amorphous glass, the aluminosilicate glass can be preferably used because it can be chemically strengthened and it can provide a magnetic disk glass substrate excellent in main surface flatness and in substrate strength.

In this Example, a molten aluminosilicate glass was molded into a disk shape by direct pressing using upper, lower, and drum molds, thereby obtaining an amorphous plate-like glass. As the aluminosilicate glass, use was made of a glass containing, as main components, $SiO_2$: 58 wt % to 75 wt %, $Al_2O_3$: 5 wt % to 23 wt %, $Li_2O$: 3 wt % to 10 wt %, and $Na_2O$: 4 wt % to 13 wt %.

Then, lapping was applied to both main surfaces of the plate-like glass, thereby obtaining a disk-shaped glass base member. The lapping was carried out using a double-side lapping machine employing a planetary gear mechanism with the use of alumina-based free abrasive particles. Specifically, the lapping was carried out by pressing lapping surface plates onto both surfaces of the plate-like glass from the upper and lower sides, supplying a grinding liquid containing the free abrasive particles onto the main surfaces of the plate-like glass, and relatively moving them to each other. By this lapping, the glass base member having the flat main surfaces was obtained.

(2) Shaping Process (Coring, Chamfering)

Then, using a cylindrical diamond drill, an inner hole was formed at a central portion of the glass substrate, thereby obtaining an annular glass substrate (coring). Then, grinding was applied to an inner peripheral end face and an outer peripheral end face using diamond grindstones, thereby carrying out predetermined chamfering (chamfering).

(3) Second Lapping Process

Then, second lapping was applied to both main surfaces of the obtained glass substrate in the same manner as in the first lapping process. By carrying out this second lapping process, fine irregularities formed on the main surfaces in the cutting-out process or an end face polishing process as a preceding process can be removed in advance, so that it becomes possible to complete a subsequent polishing process of the main surfaces in a short time.

(4) End Face Polishing Process

Then, the outer peripheral end face and the inner peripheral end face of the glass substrate were mirror-polished by a brush polishing method. In this event, as polishing abrasive particles, use was made of a slurry (free abrasive particles) containing cerium oxide abrasive particles.

Then, the glass substrate having been subjected to the end face polishing process was washed with water. By this end face polishing process, the end faces of the glass substrate were finished to a mirror surface state that can prevent precipitation of sodium and potassium.

(5) First Polishing Process

A first polishing process was first carried out as a main surface polishing process. This first polishing process mainly aims to remove cracks or strains remaining on the main surfaces during the above-mentioned lapping processes. In this first polishing process, the main surfaces were polished using a double-side polishing machine having a planetary gear mechanism with the use of a hard resin polisher. Cerium oxide abrasive particles were used as a polishing agent.

The glass substrate having been subjected to the first polishing process was immersed in respective cleaning baths of neutral detergent, pure water, and IPA (isopropyl alcohol) in turn so as to be cleaned.

(6) Chemical Strengthening Process

Then, chemical strengthening (ion exchange) was applied to the glass substrate having been subjected to the above-mentioned end face polishing process and first main surface polishing process. The chemical strengthening was carried out by preparing a chemical strengthening solution in the form of a mixture of potassium nitrate (60%) and sodium nitrate (40%), heating this chemical strengthening solution to 400° C. and preheating the cleaned glass substrate to 300° C., and immersing it in the chemical strengthening solution for about 3 hours. In order to chemically strengthen the entire surfaces of the glass substrate, the immersion was carried out in the state where a plurality of glass substrates were placed in a holder so as to be held at their end faces.

By carrying out the immersion in the chemical strengthening solution as described above, lithium ions and sodium ions in a surface layer of the glass substrate are replaced by sodium ions and potassium ions in the chemical strengthening solution, respectively, so that the glass substrate is strengthened. The thickness of a compressive stress layer formed at the surface layer of the glass substrate was about 100 µm to 200 µm.

The glass substrate having been subjected to the chemical strengthening was immersed in a water bath at 20° C. so as to be rapidly cooled and was maintained for about 10 minutes. Then, the rapidly cooled glass substrate was immersed in concentrated sulfuric acid heated to about 40° C., so as to be cleaned. Further, the glass substrate having been subjected to the sulfuric acid cleaning was immersed in respective cleaning baths of pure water and IPA in turn so as to be cleaned.

(7) Second Polishing Process

Then, a second polishing process was carried out as a main surface polishing process. This second polishing process aims to finish the main surfaces to a mirror surface state. In this second polishing process, the main surfaces were mirror-polished using a double-side polishing machine having a planetary gear mechanism with the use of a soft resin foam polisher. As a polishing agent, use was made of a slurry using colloidal silica abrasive particles (average particle size 5 nm to 80 nm) finer than the cerium oxide abrasive particles used in the first polishing process.

The polishing was carried out by setting the pH of the slurry to 2. In this event, the polishing was carried out by adding an additive containing acetic acid and acetate to the slurry. This is for controlling the pH of the slurry to be constant during the polishing process. As the above-mentioned slurry (polishing liquid), use was made of one in which 0.5 wt % citric acid was added as an additive to a mixed solution obtained by adding the above-mentioned colloidal silica particles to ultrapure water.

(8) Cleaning Process

The glass substrate having been subjected to the second polishing process was immersed in respective cleaning baths of acid cleaning, alkaline cleaning, pure water, and IPA in turn so as to be cleaned. An ultrasonic wave was applied to each cleaning bath.

In the acid cleaning, the same additive as that added in the above-mentioned second polishing process was added as an additive for the acid cleaning. Specifically, the acid cleaning was carried out using an acid solution in which citric acid was adjusted to 0.15 wt %. This is for efficiently removing the slurry fixed to the substrate by putting the same component as that contained in the slurry into the cleaning liquid. As a consequence, it is possible to reduce particles fixed to the glass substrate.

By carrying out the first lapping process, the cutting-out process, the second lapping process, the end face polishing process, the first polishing process, the chemical strengthening process, and the second polishing process as described above, there was obtained a flat, smooth, and high-rigidity magnetic disk glass substrate.

Comparative Example 1 Relating to Embodiment 1

A glass substrate was manufactured in the same manner as in Example 1 relating to the embodiment 1 except that the additive contained in a polishing liquid used in the polishing process was not contained in a cleaning liquid used in the cleaning process.

Comparative Example 2 Relating to Embodiment 1

A glass substrate was manufactured in the same manner as in Example 1 relating to the embodiment 1 except that the content of citric acid in a cleaning liquid used in the cleaning process was adjusted to 0.005 wt %.

(Defect Inspection 1)

The glass substrates obtained in the Example and the Comparative Examples were each subjected to a defect inspection using the optical defect inspection apparatus (manufactured by KLA-Tencor Corporation, trade name: OSA6100) shown in FIG. 2. In this event, a region of 15 mm to 31.5 mm from the center of the glass substrate was measured under the measurement conditions that the laser power was set to 25 mW, the laser wavelength to 405 nm, and the laser spot size to 5 µm. Table 1 shows the number of fixed defects (per 24 $cm^2$) among defects detected to have a size of 0.1 µm or more and 0.3 µm or less.

(Surface Measurement of Glass Substrate)

The glass substrates obtained in the Example and the Comparative Examples were each measured using an atomic force microscope with a resolution of 256×256 pixels in a 2 µm×2 µm square to thereby obtain a surface roughness (arithmetic mean roughness (Ra)) thereof. The results are shown in Table 1.

Further, assuming that the distance from the center of the glass substrate to the outermost periphery thereof is 100%, an arithmetic mean roughness ($Ra_O$) of the main surface in a range of 80% or more and 90% or less from the center and an arithmetic mean roughness ($Ra_I$) of the main surface in a range of 10% or more and 20% or less from the center were measured, and then a difference ($Ra_O$–$Ra_I$) therebetween was derived. The results are shown in Table 1.

A maximum peak height (Rp) and an arithmetic mean roughness (Ra) on the surface of each glass substrate were measured and then a ratio (Ra/Rp) of the arithmetic mean roughness (Ra) to the maximum peak height (Rp) was derived. The results are shown in Table 1.

Then, an adhesive layer, a soft magnetic layer, a pre-underlayer, an underlayer, a nonmagnetic granular layer, a first magnetic recording layer, a second magnetic recording layer, an auxiliary recording layer, a protective layer, and a lubricating layer were laminated in this order on each of the glass substrates obtained in the Example and the Comparative Examples, thereby manufacturing magnetic disks.

Specifically, using an evacuated film forming apparatus, the layers from the adhesive layer to the auxiliary recording layer were formed in sequence on each disk substrate in an Ar atmosphere by a DC magnetron sputtering method. The adhesive layer was made of CrTi. The soft magnetic layer was such that a Ru spacer layer was interposed between a first soft magnetic layer and a second soft magnetic layer each made of FeCoTaZr. The composition of the pre-underlayer was a NiW alloy with an fcc structure. The underlayer was such that a second underlayer (Ru) formed in high-pressure Ar was laminated on a first underlayer (Ru) formed in low-pressure Ar. The composition of the nonmagnetic granular layer was nonmagnetic $CoCr$—$SiO_2$. The composition of the first magnetic recording layer was $CoCrPt$—$Cr_2O_3$ and the composition of the second magnetic recording layer was $CoCrPt$—$SiO_2$—$TiO_2$. The composition of the auxiliary recording layer was CoCrPtB. The medium protective layer was formed by a CVD method using $C_2H_4$ and further by carrying out nitriding to introduce nitrogen into a surface thereof in the same chamber. The lubricating layer was formed by a dip coating method using PFPE.

In this event, since the amount of defects (amount of contamination) on the main surface of each glass substrate was at a very low level, the orientations of magnetic particles by sputtering were aligned so that it was possible to form the magnetic layers capable of high density recording. A durability test was conducted for the magnetic disks thus obtained.

(Durability Test)

The durability test was conducted by mounting the magnetic disk in an LUL (load/unload) type HDD device. Specifically, in the state where the magnetic disk and a DFH head having a giant magnetoresistive effect reproducing element (GMR element) were installed in the magnetic recording device, the durability test was conducted by carrying out load/unload tests in a predetermined number of times (2,000,000 times) at a head flying height of 6 nm. The results are shown in Table 1.

TABLE 1

| | Number of Defects | AFM-Ra/ nm | Ra/Rp | $Ra_O$-$Ra_I$/ nm | Durability Test Result |
|---|---|---|---|---|---|
| Example 1 | 1 or less | 0.11 | 0.14 | 0.004 | 2,000,000 times L/UL OK |
| Comparative Example 1 | 6 | 0.12 | 0.17 | 0.006 | 400,000 times L/UL NG |
| Comparative Example 2 | 3 | 0.12 | 0.15 | 0.005 | 800,000 times L/UL NG |

Example 1 Relating to Embodiment 2

Hereinbelow, a description will be given of an Example about methods of manufacturing a magnetic disk glass substrate and a magnetic disk to which this invention is applied. These magnetic disk glass substrate and magnetic disk are manufactured as a magnetic disk having a predetermined shape, such as a 3.5-inch disk (ϕ89 mm) or a 2.5-inch disk (ϕ65 mm).

(1) First Lapping Process

In the magnetic disk glass substrate manufacturing method according to this Example, first, lapping (grinding) is applied to surfaces of a plate-like glass to obtain a glass base member, then this glass base member is cut, thereby cutting out a glass disk. As the plate-like glass, one of various plate-like glasses can be used. This plate-like glass can be manufactured by a known manufacturing method such as a press method, a float method, a downdraw method, a redraw method, or a fusion method using, for example, a molten glass as a material. If the press method is used among them, the plate-like glass can be manufactured at low cost. As a material property of the plate-like glass, use can be made of an amorphous glass or a glass ceramic (crystallized glass). As a material of the plate-like glass, use can be made of an aluminosilicate glass, a sodalime glass, a borosilicate glass, or the like. Particularly as the amorphous glass, the aluminosilicate glass can be preferably used because it can be chemically strengthened and it can provide a magnetic disk glass substrate excellent in main surface flatness and in substrate strength.

In this Example, a molten aluminosilicate glass was molded into a disk shape by direct pressing using upper, lower, and drum molds, thereby obtaining an amorphous plate-like glass. As the aluminosilicate glass, use was made of a glass containing, as main components, $SiO_2$: 58 wt % to 75 wt %, $Al_2O_3$: 5 wt % to 23 wt %, $Li_2O$: 3 wt % to 10 wt %, and $Na_2O$: 4 wt % to 13 wt %.

Then, lapping was applied to both main surfaces of the plate-like glass, thereby obtaining a disk-shaped glass base member. The lapping was carried out using a double-side lapping machine employing a planetary gear mechanism with the use of alumina-based free abrasive particles. Specifically, the lapping was carried out by pressing lapping surface plates onto both surfaces of the plate-like glass from the upper and lower sides, supplying a grinding liquid containing the free abrasive particles onto the main surfaces of the plate-like glass, and relatively moving them to each other. By this lapping, the glass base member having the flat main surfaces was obtained.

(2) Shaping Process (Coring, Chamfering)

Then, using a cylindrical diamond drill, an inner hole was formed at a central portion of the glass substrate, thereby obtaining an annular glass substrate (coring). Then, grinding was applied to an inner peripheral end face and an outer peripheral end face using diamond grindstones, thereby carrying out predetermined chamfering (chamfering).

(3) Second Lapping Process

Then, second lapping was applied to both main surfaces of the obtained glass substrate in the same manner as in the first lapping process. By carrying out this second lapping process, fine irregularities formed on the main surfaces in the cutting-out process or an end face polishing process as a preceding process can be removed in advance, so that it becomes possible to complete a subsequent polishing process of the main surfaces in a short time.

(4) End Face Polishing Process

Then, the outer peripheral end face and the inner peripheral end face of the glass substrate were mirror-polished by a brush polishing method. In this event, as polishing abrasive particles, use was made of a slurry (free abrasive particles) containing cerium oxide abrasive particles.

Then, the glass substrate having been subjected to the end face polishing process was washed with water. By this end face polishing process, the end faces of the glass substrate were finished to a mirror surface state that can prevent precipitation of sodium and potassium.

(5) First Polishing Process

A first polishing process was first carried out as a main surface polishing process. This first polishing process mainly aims to remove cracks or strains remaining on the main surfaces during the above-mentioned lapping processes. In this first polishing process, the main surfaces were polished using a double-side polishing machine having a planetary gear mechanism with the use of a hard resin polisher. Cerium oxide abrasive particles were used as a polishing agent.

The glass substrate having been subjected to the first polishing process was immersed in respective cleaning baths of neutral detergent, pure water, and IPA (isopropyl alcohol) in turn so as to be cleaned.

(6) Chemical Strengthening Process

Then, chemical strengthening (ion exchange) was applied to the glass substrate having been subjected to the above-mentioned end face polishing process and first main surface polishing process. The chemical strengthening was carried out by preparing a chemical strengthening solution in the form of a mixture of potassium nitrate (60%) and sodium nitrate (40%), heating this chemical strengthening solution to 400° C. and preheating the cleaned glass substrate to 300° C., and immersing it in the chemical strengthening solution for about 3 hours. In order to chemically strengthen the entire surfaces of the glass substrate, the immersion was carried out in the state where a plurality of glass substrates were placed in a holder so as to be held at their end faces.

By carrying out the immersion in the chemical strengthening solution as described above, lithium ions and sodium ions in a surface layer of the glass substrate are replaced by sodium ions and potassium ions in the chemical strengthening solution, respectively, so that the glass substrate is strengthened. The thickness of a compressive stress layer formed at the surface layer of the glass substrate was about 100 μm to 200 μm.

The glass substrate having been subjected to the chemical strengthening was immersed in a water bath at 20° C. so as to be rapidly cooled and was maintained for about 10 minutes. Then, the rapidly cooled glass substrate was immersed in concentrated sulfuric acid heated to about 40° C., so as to be cleaned. Further, the glass substrate having been subjected to the sulfuric acid cleaning was immersed in respective cleaning baths of pure water and IPA in turn so as to be cleaned.

(7) Second Polishing Process

Then, a second polishing process was carried out as a main surface polishing process. This second polishing process aims to finish the main surfaces to a mirror surface state. In this second polishing process, the main surfaces were mirror-polished using a double-side polishing machine having a planetary gear mechanism with the use of a soft resin foam polisher. As a polishing agent, use was made of a slurry using colloidal silica abrasive particles (average particle size 5 nm to 80 nm) finer than the cerium oxide abrasive particles used in the first polishing process.

The polishing was carried out by setting the pH of the slurry to 2. In this event, the polishing was carried out by adding an additive containing acetic acid and acetate to the slurry. This is for controlling the pH of the slurry to be constant during the polishing process. As the above-mentioned slurry (polishing liquid), use was made of one in which 0.5 wt % citric acid was added as an additive to a mixed solution obtained by adding the above-mentioned colloidal silica particles to ultrapure water.

(8) Cleaning Process

The glass substrate having been subjected to the second polishing process was immersed in respective cleaning baths of acid cleaning, alkaline cleaning, pure water, and IPA in turn so as to be cleaned. An ultrasonic wave was applied to each cleaning bath.

In the acid cleaning, the same additive as that added in the above-mentioned second polishing process was added as an additive for the acid cleaning. Specifically, the acid cleaning was carried out using an acid solution in which citric acid was adjusted to 0.15 wt %. This is for efficiently removing the slurry fixed to the substrate by putting the same component as that contained in the slurry into the cleaning liquid. As a consequence, it is possible to reduce particles fixed to the glass substrate.

By carrying out the first lapping process, the cutting-out process, the second lapping process, the end face polishing process, the first polishing process, the chemical strengthening process, and the second polishing process as described above, there was obtained a flat, smooth, and high-rigidity magnetic disk glass substrate.

Comparative Example 1 Relating to Embodiment 2

A glass substrate was manufactured in the same manner as in Example 1 relating to the embodiment 2 except that the additive contained in a polishing liquid used in the polishing process was not contained in a cleaning liquid used in the cleaning process and that the second polishing process was carried out before the chemical strengthening process.

Examples 2-3 and Comparative Examples 2-6 Relating to Embodiment 2

Magnetic disk glass substrates were respectively manufactured by variously changing the polishing conditions and the cleaning conditions.

(Defect Inspection 2)

The glass substrates were each subjected to a defect inspection based on the laser Doppler technique using the apparatus shown in FIG. 5. In this event, ThoT Model 42000 (manufactured by ThoT Technologies, Inc.) was used as the inspection apparatus. The number of defects having a size of 0.1 μm or more and 0.6 μm or less in plan view and a depth of 0.5 nm or more and 2 nm or less was derived. The results are shown in Table 2.

(Surface Measurement of Glass Substrate)

The glass substrates obtained in the Examples and the Comparative Examples were each measured using an atomic force microscope with a resolution of 256×256 pixels in a 2 μm×2 μm square to thereby obtain a surface roughness (arithmetic mean roughness (Ra)) thereof. The results are shown in Table 2.

Further, assuming that the distance from the center of the glass substrate to the outermost periphery thereof is 100%, an arithmetic mean roughness ($Ra_O$) of the main surface in a range of 80% or more and 90% or less from the center and an arithmetic mean roughness ($Ra_I$) of the main surface in a range of 10% or more and 20% or less from the center were measured, and then a difference ($Ra_O$–$Ra_I$) therebetween was derived. The results are shown in Table 2.

A maximum valley depth (Rv) and an arithmetic mean roughness (Ra) on the surface of each glass substrate were measured and then a ratio (Ra/Rv) of the arithmetic mean roughness (Ra) to the maximum valley depth (Rv) was derived. The results are shown in Table 2.

Then, an adhesive layer, a soft magnetic layer, a pre-underlayer, an underlayer, a nonmagnetic granular layer, a first magnetic recording layer, a second magnetic recording layer, an auxiliary recording layer, a protective layer, and a lubricating layer were laminated in this order on each of the glass substrates obtained in the Examples and the Comparative Examples, thereby manufacturing magnetic disks.

Specifically, using an evacuated film forming apparatus, the layers from the adhesive layer to the auxiliary recording layer were formed in sequence on each disk substrate in an Ar atmosphere by a DC magnetron sputtering method. The adhesive layer was made of CrTi. The soft magnetic layer was such that a Ru spacer layer was interposed between a first soft magnetic layer and a second soft magnetic layer each made of FeCoTaZr. The composition of the pre-underlayer was a NiW alloy with an fcc structure. The underlayer was such that a second underlayer (Ru) formed in high-pressure Ar was laminated on a first underlayer (Ru) formed in low-pressure Ar. The composition of the nonmagnetic granular layer was nonmagnetic CoCr—$SiO_2$. The composition of the first magnetic recording layer was CoCrPt—$Cr_2O_3$ and the composition of the second magnetic recording layer was CoCrPt—$SiO_2$—$TiO_2$. The composition of the auxiliary recording layer was CoCrPtB. The medium protective layer was formed by a CVD method using $C_2H_4$ and further by carrying out nitriding to introduce nitrogen into a surface thereof in the same chamber. The lubricating layer was formed by a dip coating method using PFPE.

(LUL (Load/Unload) Test)

The above-mentioned magnetic disk and a DFH head having a giant magnetoresistive effect reproducing element (GMR element) were installed in a magnetic recording device. Then, with a flying height of 10 nm during flying of the magnetic head, load/unload operations of the head were repeated in a high-temperature, high-humidity environment of 70° C. and 80% RH in the magnetic recording device.

(Corrosion Inspection)

The obtained magnetic disks were left in a high-temperature, high-humidity environment of 70° C. and 80% RH for 120 hours and then taken out. Then, it was inspected whether or not corrosion occurred on a surface of each magnetic disk, by a visual inspection under a high-intensity halogen lamp and an inspection using an optical microscope with 50 times magnification.

Evaluation criteria were defined as follows.

(Number of Luminescent Spots per 1 $cm^2$)

⊙=0
○=1 to 2
Δ=3 to 5
x=6 to 10
xx=11 or more

TABLE 2

|  | Number of Defects | AFM-Ra/nm | Ra/Rp | $Ra_O$-$Ra_I$/nm | Durability Test Result | Corrosion Test |
| --- | --- | --- | --- | --- | --- | --- |
| Example 1 | 5 | 0.11 | 0.15 | 0.004 | 2,000,000 times L/UL OK | • |
| Example 2 | 9 | 0.12 | 0.18 | 0.005 | 2,000,000 times L/UL OK | • |
| Example 3 | 9 | 0.12 | 0.14 | 0.005 | 1,800,000 times L/UL NG | ○ |
| Comparative Example 1 | 53 | 0.17 | 0.13 | 0.006 | 200,000 times L/UL NG | xx |
| Comparative Example 2 | 40 | 0.15 | 0.14 | 0.005 | 200,000 times L/UL NG | xx |
| Comparative Example 3 | 25 | 0.19 | 0.12 | 0.006 | 300,000 times L/UL NG | x |
| Comparative Example 4 | 11 | 0.21 | 0.11 | 0.005 | 300,000 times L/UL NG | Δ |
| Comparative Example 5 | 8 | 0.17 | 0.15 | 0.005 | 500,000 times L/UL NG | ○ |
| Comparative Example 6 | 14 | 0.12 | 0.15 | 0.005 | 800,000 times L/UL NG | ○ |
| Reference Example | 9 | 0.12 | 0.14 | 0.012 | 1,500,000 times L/UL NG | ○ |

As described above, according to this invention, it is possible to obtain a magnetic disk glass substrate having very few defects present on its surface with an arithmetic mean roughness (Ra) at a level in the vicinity of 0.1 nm and thus to achieve the magnetic disk glass substrate which is suitable as a substrate for a magnetic disk with a high recording density of 160 GB or more per disk, particularly 250 GB or more per disk.

A magnetic disk glass substrate manufacturing method of this invention is preferably configured such that it comprises a process of applying at least shaping and lapping to a disk base member having a main surface, a polishing process of polishing the main surface, and a cleaning process of cleaning the disk base member after the polishing, wherein an additive contained in a polishing liquid for use in the polishing process is contained in a cleaning liquid for use in the cleaning process. According to this method, by causing the additive contained in the polishing liquid for use in the polishing process to be contained in the cleaning liquid for use in the cleaning process, it is possible to obtain a magnetic disk glass substrate having very few defects present on its surface with an arithmetic mean roughness (Ra) at a level in the vicinity of 0.1 nm and thus to achieve the magnetic disk glass substrate which is suitable as a substrate for a magnetic disk with a high recording density of 160 GB or more per disk, particularly 250 GB or more per disk.

This invention is not limited to the above-mentioned embodiments and can be carried out by appropriately changing them. For example, the number of components, the sizes, the processing sequences, and so on in the above-mentioned embodiments are only examples and this invention can be carried out by changing them in various ways within a range capable of exhibiting the effect of this invention. Other than those, this invention can be carried out with appropriate changes within a range not departing from the object of this invention.

DESCRIPTION OF SYMBOLS 1 magnetic disk glass substrate
1a surface
1b adhering matter
1c convex defect
1d concave defect
2 hole
11, 12 laser
13 detector
21 magnetic disk glass substrate
21a surface
21b adhering matter
21c convex defect
21d concave defect
22 nanopit
23 magnetic layer
24 crack
31 laser
32 detector

The invention claimed is:

1. A magnetic disk glass substrate, wherein an arithmetic mean roughness (Ra) of a polished main surface of the glass substrate measured using an atomic force microscope with a resolution of 256×256 pixels in a 2 μm×2 μm square is 0.12 nm or less and, among defects detected to have a size of 0.1 μm or more and 0.3 μm or less upon irradiating light with a wavelength of 405 nm onto the glass substrate with a spot size of 5 μm and detecting scattered light from the glass substrate, the number of the defects fixed to the glass substrate, whose position on the glass substrate is not changed before and after the glass substrate is immersed for 200 seconds in the dilute sulfuric acid solution adjusted to pH4, is 1 or less per 24 cm$^2$,
  wherein the glass substrate is an amorphous aluminosilicate glass, and
  wherein a ratio (Ra/Rp) of the arithmetic mean roughness (Ra) to a maximum peak height (Rp) on the main surface of the glass substrate is 0.15 or more.

2. A magnetic disk glass substrate, wherein an arithmetic mean roughness (Ra) of a polished main surface of the glass substrate measured using an atomic force microscope with a resolution of 256×256 pixels in a 2 μm×2 μm square is 0.12 nm or less and the number of concave defects detected to have a size of 0.1 μm or more and 0.6 μm or less in plan view and a depth of 0.5 nm or more and 2 nm or less is less than 10 per 24 cm$^2$, the defects each being detected using a shift in wavelength between incident light and reflected light upon irradiating and scanning helium neon laser light with a wavelength of 632 nm on the main surface of the glass substrate,
  wherein the glass substrate is an amorphous aluminosilicate glass, and
  wherein a ratio (Ra/Rv) of the arithmetic mean roughness (Ra) to a maximum valley depth (Rv) on the main surface of the glass substrate is 0.15 or more.

3. The magnetic disk glass substrate according to claim 1 or 2, wherein the glass substrate has a disk shape with a hole at a center thereof and, assuming that a distance from the center to an outermost periphery is 100%, a difference ($Ra_O - Ra_I$) between an arithmetic mean roughness ($Ra_O$) of the main surface in a range of 80% or more and 90% or less from the center and an arithmetic mean roughness ($Ra_I$) of the main surface in a range of 10% or more and 20% or less from the center is 0.01 nm or less.

4. The magnetic disk glass substrate according to claim 1, wherein the glass substrate has the main surface and an end face,
  the main surface and the end face each have a compressive stress layer, and
  the compressive stress layer of the main surface has a depth which is shallower than that of the compressive stress layer of the end face.

5. A magnetic disk, wherein at least a magnetic layer is formed on the magnetic disk glass substrate according to claim 1.

6. The magnetic disk according to claim 5, wherein the magnetic disk is a patterned medium in which at least adjacent recording tracks are magnetically isolated from each other.

7. The magnetic disk glass substrate according to claim 1, wherein the magnetic disk glass substrate is an isotropic substrate in which the surface roughness (arithmetic mean roughness (Ra)) of the glass substrate in its circumferential direction and the surface roughness thereof in its radial direction are equal to each other.

8. The magnetic disk glass substrate according to claim 2, wherein the magnetic disk glass substrate is an isotropic substrate in which the surface roughness (arithmetic mean roughness (Ra)) of the glass substrate in its circumferential direction and the surface roughness thereof in its radial direction are equal to each other.

* * * * *